3,158,567
HYDROGENATION PROCESS
Edward L. Cole, Glenham, and Edwin C. Knowles, Poughkeepsie, N.Y., assignors to Texaco Inc., New York, N.Y., a corporation of Delaware
No Drawing. Filed Mar. 16, 1961, Ser. No. 96,080
6 Claims. (Cl. 208—143)

This invention relates to the treatment of a hydrocarbon and, more particularly, to the hydrogenation of a hydrocarbon in the presence of an improved catalyst. This application is a continuation-in-part of our United States application, Serial No. 79,188, filed December 29, 1960.

Catalytic hydrogenation of hydrocarbons is known in the art, and may be carried out over a wide range of operating conditions. For example, temperatures of from about 400° to 800° F. and pressures of from about 300 to 10,000 p.s.i.g. may be used. Thus, for example, hydrogenation of a lubricating oil carried out in the presence of hydrogen and a suitable catalyst, may be conducted under relatively mild conditions for the purpose of improving the color characteristics of the lubricating oil. On the other hand, more severe conditions may be employed where it is desirable to effect the hydrogenation of the feed charge or where it is desirable to crack out unsuitable components. Still further, hydrogenation may be employed to remove oxygen, nitrogen and sulfur constituents from petroleum fractions.

During catalytic processing with solid particulate catalyst, the reactants are passed through a bed of porous catalyst particles, beads or pellets. In many such reactions employing organic materials at elevated temperatures, a carbonaceous deposit accumulates on the catalyst surface and in the pores and openings of the catalyst as the process proceeds under continuous operating conditions. This deposition of carbonaceous material, commonly known as fouling of the catalyst, is a function of the reactants, the reaction products, the conditions of the process, and the catalyst, and certain types of reactions may be worse offenders than others. Fouling may be particularly excessive when the reactants or products remain in contact with the catalyst for a relatively long time. When a porous catalyst is used, the reactants diffuse into the interior or central portion of the catalyst particle and may be retained for an excessive period of time whereupon decomposition of the reactants and products result in fouling the catalyst. Fouling results not only in a decrease in catalyst activity and loss in selectivity, but also results in intensification of the heat transfer problem in the catalyst bed thereby resulting in local overheating or "hot spots," particularly during regeneration of the catalyst.

Heat transfer and temperature control in a catalyst bed often are difficult problems by reason of the heat of reaction which accompanies numerous catalytic reactions. Thus, in an exothermic reaction, for example, the heat evolved in processing may result in formation of local overheating or "hot spots" unless distributed substantially uniformly throughout the catalyst bed or otherwise dissipated from the reaction zone. Generally it is desirable, or essential, to maintain the reaction temperature within a predetermined range in order to obtain the maximum yield of desired products. Local overheating and temperature variations in the catalyst bed are therefore deleterious and may result in excessive coking of the reactants, inactivation of the catalyst, or otherwise cause undesired side reactions.

The catalyst bed, customarily provided in a composite form comprising an active component supported by a carrier, is generally a relatively poor conductor of heat. Temperature control may be particularly difficult in a conventional packed column or fixed bed reactor where each layer of catalyst is, in effect, partially insulated from adjacent layers. Heat carriers or heat conductive materials have been proposed as one means of reducing temperature gradients in a catalyst bed. For carrying out some highly exothermic or highly endothermic reactions, it has been proposed to incorporate pieces of metal or other suitable heat conductive solid material in the fixed catalyst bed to facilitate heat transfer to the surroundings. Heat transfer and temperature control of the catalyst bed have been achieved by employing a gaseous or liquid heat-transfer medium usually circulated through a jacket surrounding the reactor. The reactants may be diluted with steam or an inert gas as a further means of achieveing temperature control. However, the known or proposed methods regarding thermal control necessitate especially designed reactors, and further may require materials and equipment in addition to that normally employed.

In certain processing operations, the temperature may be controlled within the desired range by employing low flow rates or low conversion levels to limit the rate of heat released by the reaction. However, this normally results in a corresponding decrease in yield per unit of time. Notwithstanding this precaution, uncontrollable local overheating and temperature variations in the catalyst bed may occur.

This invention has therefore as its purpose to provide a catalytic structure suitable for use in the hydrogenation of a hydrocarbon, and capable of operating under substantially isothermal conditions and characterized by relatively high activity over long periods of use. The catalytic structure of this invention for use in hydrogenation reactions is provided with an extended metal substrate exhibiting relatively higher thermal conductivity which affords an effective means for adequately controlling the thermal conditions of the reaction thereby minimizing, or substantially eliminating, temperature variations in the catalyst bed and local overheating and fouling. Equally important, our catalytic structure is not restricted to any particular configuration, and may comprise the walls of the reactor thereby obviating the need for employing a packed column of catalyst. As a result, the quantity of active catalyst material used in our catalytic structure is greatly reduced as compared to the quantity required in conventional structures. This eliminates a substantial portion of the structural and supporting members of the reactor, permits compactness in design and decreases substantially the capital costs and operating costs. It is significant that the foregoing and other objects are realized without diminishing the flow rates of the reactants, but, on the contrary, the reaction rates may be greatly increased without any appreciable decrease in product yield. These together with other objects and advantages will be apparent to one skilled in the art upon reading the following description.

The novel catalytic structure of our invention involves broadly an extended metal substrate exhibiting relatively high thermal conductivity and capable of readily forming an adherent oxide coating or film. Metals found most useful include those selected from the group consisting of aluminum, tantalum, titanium, zirconium and hafnium. A catalyst material is deposited upon the oxide film integral with the substrate, which material may be deposited in a form possessing catalytic activity or capable of being rendered susceptible of catalytic activity by subsequent treatment, as explained more fully hereinbelow. Depending to a large extent upon the catalyst material employed, our invention was found to be extremely advantageous and economical for use in hydrogenation processes conducted either in liquid or vapor phase.

In accordance with the invention, the metal substrate which is to be employed in the catalytic structure is first provided with an adherent oxide film, preferably a relatively porous and adsorbent oxide film, which serves as the catalyst carrier. The metal substrate is of extended dimensions and is particularly of a length and geometric surface area substantially greater than that of discrete particles. Metals found most useful and susceptible of rendering the desired oxide film include those selected from the group consisting of aluminum, tantalum, titanium, zirconium and hafnium, and more preferably aluminum, tantalum and titanium. As used herein, this is intended to include a pure metal, a commercial metal containing the usual impurities and a base alloy of the metal.

The oxide film may be produced by any of several known methods, including chemical and electro-chemical methods, but must be of sufficient thickness to provide adequate adsorptive capacity for retaining the catalyst deposit. To insure adequate performance under the conditions encountered in catalytic processing, however, the artificially produced oxide film generally should not be substantially thinner than about 0.1 mil, and preferably not less than about 0.5 mil, usually about 0.5 to 1 mil being desirable. Where an aluminum metal substrate is employed, for example, the oxide film may be produced by treating the aluminum surface with a solution of an alkaline carbonate, usually a sodium carbonate-chromate solution. The film may be produced by the anodic oxidation of the metal surface whereby the metal is made the anode in an electrolytic solution. In anodizing aluminum, a 15% sulfuric acid solution is commonly employed as the electrolyte, but other acid electrolytes such as chromic acid, oxalic acid, phosphoric acid and sometimes boric acid may be used. Titanium, tantalum, hafnium and zirconium may be anodized advantageously in a boric acid-ammonia solution having a pH of about 8. In all cases the oxide film to which this invention relates is produced by artificial means and does not include relatively thin natural oxide films occurring on metal surfaces which have been exposed to the atmosphere.

The present invention is particularly applicable to anodic films, and more especially to aluminum surfaces having an anodically produced film, and therefore will be described in more detail in connection with films of this type. Oxide films formed by this well-known commercial method are relatively porous and adsorbent, and though this constitutes a preferred embodiment of our invention, it should be understood that other conversion films, including barrier type films, are also useful in the preparation of the catalyst structure of our invention.

The method utilized in depositing the catalyst material upon the oxide film is dependent to some extent upon the particular catalyst material employed. In one method, the catalyst material is deposited by chemically reducing a solution containing a soluble compound of the catalyst material in the presence of the metal substrate bearing the oxide film under such conditions as to effect a substantially uniform deposition of the catalyst material upon the oxide surface. Although the exact form of the deposit of catalyst material cannot be definitely determined, it is believed that the material is deposited from solution as elemental metal or as its intermediate product of reduction, such as the oxide. Chemical reduction of the deposit is particularly useful in those instances where the elemental metal or its intermediate product of reduction exhibits the required catalytic activity, or where a deposit of the metal may be rendered active upon subsequent treatment. In several cases, a compound of the metal forms with a stabilizing agent a soluble complex which may be readily reduced to the elemental metal or its intermediate product of reduction with a suitable reducing agent, preferably a reducing gas, for example, hydrogen. Suitable stabilizing agents include complexing agents which form soluble complex ions of the co-ordinate complex type, sequestering agents, chelating agents, dispersants and detergents. Thus, compounds or salts of numerous metals form with ammonia, for example, a co-ordination type complex. As shown in the parent application, these metals usually include those from Groups I, VI and VIII of the Periodic Table of Elements, for example, copper, silver, gold, chromium, molybdenum, tungsten, iron, cobalt, nickel, platinum, palladium, osmium and iridium, but may also embrace other elements including those from Groups II, III, IV, V and VII of the Periodic Table, for example, zinc, cadmium, mercury, tin, zirconium, vanadium, manganese, and combinations thereof. Among these are included many known and useful hydrogenation catalysts. The deposit is generally calcined and activated by subsequent treatment, for example, reducing or sulfiding of the catalyst metal or metals.

The non-metallic ion or the anion of the metal compound or salt to be precipitated from the ammoniacal solution may be of any inorganic acid or strong organic acid which forms a soluble salt of the metal and is not reduced under precipitation conditions. Those anions usually employed include sulfate, chloride, nitrate, carbonate, chromate and vandate, and the organic anion generally being acetate. The solvent generally used is an aqueous solution, but suitable organic solvents, including alcohols, aldehydes, ethers, ketones, toluene and pyridine may be used, as may liquid ammonia.

Although ammonia is the preferred stabilizing agent and the invention is described in greater detail in connection with solutions of this type, certain other stabilizing agents may be employed. Other suitable stabilizing agents include the organic primary, secondary and tertiary amines such as methyl amine, ethylenediamine and diethylenetriamine. In addition, stabilizing agents may include phosphates, especially pyrophosphate and metaphosphate, as well as citrate, acetate, oxalate, tartrate, o-phenanthroline, thiocyanate, thiosulfate, thiourea, pyridine, quinoline and cyano groups. Still further useful complex formations include the chloro, hydroxo and aquo complexes, such as the aquoammonia complexes. Olefin and olefin-like compounds are also useful, and may include, for example, ethylene, propylene, butadiene, etc., as well as the unsaturated cyclo compounds such as cyclohexene and styrene. However, the olefin and olefin-like compounds are desirably employed in a non-aqueous solvent, for example, benzene, toluene, pyridine, acetone and ether.

The catalyst material may be deposited on the oxide film by the action of a reducing agent, preferably hydrogen, on a solution containing a soluble complex of the catalyst material, such as an ammoniacal solution of a salt of the catalyst material. The temperature and pressure employed in the reducing step depend upon the material undergoing reduction and may vary over a wide range. Thus, for example, platinum may be deposited from ethylene chloroplatinate in benzene by reduction with hydrogen at room temperature and atmospheric pressure. However, with numerous other metals, reduction proceeds advantageously at elevated temperatures which may range up to 500° F. and under a partial pressure of as high as 4000 pounds per square inch or higher. To effect a substantially uniform, adherent deposit of the catalyst material upon the oxide film of a metal substrate of extended surface area, we found it especially desirable that reduction and deposition proceed under a substantially quiescent condition, or maintain the system substantially free from turbulence. It should be understood that other reducing gases such as carbon monoxide may be used with satisfactory results, as may other reducing agents such as hydrazine, hydroxylamine, glyoxal, formaldehyde or sulfur dioxide.

By way of example, a deposit of nickel or molybdenum may be formed on the oxide film of the substrate from an ammoniacal solution of salt of the metal by reducing the solution with hydrogen at elevated temperature and pressure. The deposit may be sulfided with hydrogen sulfide gas at elevated temperature and the sulfide catalyst formed then may be used in the hydrogenation of hydrocarbons. A mixture of metal salts, all of which form complex ions with ammonia, may be used for forming a deposit of more than one catalytic element. By such means, a nickel-molybdenum catalyst or cobalt-molybdenum-nickel catalyst may be deposited on the oxide film for use as hydrogenation catalyst. Also, nickel-molybdenum or nickel-tungsten salts may be complexed in a citrate solution, and precipitated from solution with hydrogen as described above. The co-deposits may then be calcined or otherwise activated.

As an alternative procedure, the added catalyst material may be impregnated on the oxide film by contacting the oxide coated substrate with a solution containing the catalyst material. Generally, this is accomplished by immersing the coated substrate in a solution of a salt of the catalyst material. The conditions for impregnating, i.e., concentration, temperature, time and pH, will depend largely upon the material employed and upon the amount of catalyst material required. The deposit is then calcined and activated in place as by oxidizing, reducing, sulfiding, etc. The parent case shows that by this method, the oxide film may be impregnated with such catalyst material as salts or compounds of metals from Group I through VIII of the Periodic Table, and particularly Groups I, IV, VI and VIII, including for example, copper, silver, zinc, tin, vanadium, chromium, molybdenum, manganese, cobalt, and iron. Among these are many known and useful hydrogenation catalysts.

Although aqueous solutions are usually employed, the catalyst material may be impregnated on the oxide carrier from a non-aqueous solution, particularly acetone, ethanol and the like. Thus, for example, the oxide film may be impregnated with molybdenum blue from an acetone solution of the salt. The molybdenum deposit, upon calcining, may be a useful catalyst in the hydrogenation of lube oil. In addition, the catalyst material may be impregnated onto the oxide carrier from the vapor phase, as for example by thermally decomposing a metal carbonyl, such as molybdenum hexacarbonyl, and the deposit calcined to the oxide which, in turn, may be sulfided by conventional practice.

In order to assure deposition of the desired quantity of the catalyst material, it may be necessary in some cases to repeat the particular process employed in depositing the material, including the successive steps of deposition, and drying or activation where required. Depending on the added catalyst deposit and its intended use, the oxide film may be substantially inert or it may have a synergistic effect upon the catalyst material. It should be understood that a suitable promoter or inhibitor may be added to the catalyst material, or incorporated with the reactants undergoing catalytic treatment.

It will be observed that the catalyst material, inactivated during processing, may be regenerated in situ. However, when the catalyst is no longer regeneratable and recovery of the catalyst material is desired, the oxide coating with the added catalyst material may be sloughed off from the metal substrate as by electro-chemical means when the substrate is made the cathode in an electrolytic cell. The valuable catalyst material can be recovered by separation from the slough, and the recovered catalyst material may be redeposited on a freshly formed oxide film and used again.

Referring now in greater detail to the catalytic structure of our invention, and the attendant advantages, the extended metal substrate is initially provided with an artificially produced oxide film which is relatively thin as compared to the substrate. The extended metal substrate is not restricted to any particular configuration, and may include metal bars, balls, chain, plates, saddles, sheet, tubes or the like, the member of the substrate not being less than about ⅛-inch in its maximum dimension, and more preferably ¼-inch, and of sufficient thickness on which the oxide film may be adequately produced and still maintain a free metal substrate. Generally an oxide film of about 0.5 to 1 mil is sufficient, but thicker film, or thinner film, may be employed where desired. The thin oxide film with the added catalyst material defines the depth of the catalyst bed, and therefore limits the extent of diffusion of the reactants through the pores and openings in the bed to this shallow depth. As a consequence, substantially all of the catalyst material is exposed to the reactants, and entrapment of the reactants in the catalyst is minimized or substantially eliminated. In this manner, we readily achieve with less catalyst material a reactive capacity equal to, or greater than, that accomplished by conventional catalysts.

Equally important, the catalytic structure of our invention having a catalyst material deposited thereon functions substantially as an isothermal surface. During a catalytic process, heat transfer in the catalyst bed is readily accomplished by means of the extended metal substrate. Depending on the nature of the reaction, heat may be extracted from, or supplied to, the reactor through the metal substrate thereby providing an adequate means for controlling temperature conditions in the catalyst bed. Thus, in an exothermic process, for example, the metal substrate will conduct the heat to the surroundings of the reactor, and the excess heat extracted therefrom preferably by means of a cooling medium employed in heat exchange relation with the reactor.

In a preferred embodiment of our invention, the catalytic structure is provided in the form of a tube of relatively small inside diameter. The inside diameter of the tube, in general may range from about 0.05 to 0.5 inch, but is dependent upon the type of catalytic reaction, materials undergoing reaction and the capacity of the pumping mechanism to accomplish sufficient turbulence. At least one surface or wall of the tube, and preferably the interior wall of the tube, is provided with an oxide film, e.g., an anodically produced oxide film, and the added catalyst material is deposited thereon. The tube through which the reactants pass is preferably of a continuous length sufficient to accomplish the desired catalytic reaction in economic yields, but may be coiled to conserve space. The length of the tube may depend to some extent upon the reaction contemplated, and therefore may be readily determined by one skilled in the art. The wall of the reactor provides adequate support and mechanical strength for the catalyst, and thereby affords a substantially self-sustaining structure. Packed reaction columns are eliminated as are may of the structural and supporting features employed in a conventional catalytic reactor.

It will be observed that the metal tube provides an adequate means to control the temperature or heat transfer to or from the catalyst. The metal wall, being a good heat conductor, may be employed as a heat exchanger notwithstanding the relatively thin oxide film. A suitable heat exchange medium may be applied to the exterior wall of the metal tube, for example. During processing, the heat evolved in the catalyst bed is readily conducted by the wall of the tube to the surroundings where it is absorbed and dissipated by the heat exchange medium. On the other hand, the tubular wall may be employed for supplying heat from a heating medium to the reactor or reaction medium. It should be understood that in an economic and commercial operation, a number of the catalytic tubes may be housed in parallel in a single unit and arranged in contacting relation with a heat exchange medium.

It is of further significance that in the catalytic tube having a relatively small inside diameter, turbulent flow of the reactants passing through the tube is readily maintained. As a consequence, near maximum reaction rates are achieved. In addition, the catalytic structure of our invention markedly reduces the residence time of the reactants in the reactor, as explained above. Consequently, the reactor may be operated at high temperatures, or optimum temperatures, or more important, in many cases at higher temperatures in order to take advantage of faster reaction rates than those normally encountered in a conventional reactor, without danger of excessive coking or fouling of the catalyst.

The catalytic tube or sheet formed in accordance with the invention is of further advantage in that the reactant gases in certain processes may be caused to pass through the tube or sheet by use of a pervious or permeable tube or sheet, optionally with the application of a pressure differential between the interior and exterior of the tube or opposite sides of the sheet. A porous ture or wall may be formed from powdered metal, preferably sintered, by known procedures in the field of powder metallurgy. Thus, for example, in hydrogenation process, hydrogen may be diffused through the tube and into immediate contact with the catalyst surface where reaction occurs, thereby more fully utilizing the reactants and increasing the reaction rates. In other processes, the reactant gases may be caused to pass in or out of the catalyst tube through the permeable wall of the tube.

The following examples will further illustrate our invention.

EXAMPLE 1

Aluminum tubing having a nominal composition of about 2% by weight alloying constituents, the balance being aluminum was coiled to form two 11 foot sections, each section having an inside diameter of 0.089 inch and a wall thickness of 0.048 inch. The sections of tubing are desirably cleaned on the interior surface by conventional practice as by etching for one minute in a 5% aqueous sodium hydroxide solution at 150° F., rinsing with water, and then immersing in a 35% nitric acid solution for 30 seconds at room temperature and again rinsing with water. The interior wall of the tubing was then anodized in a moving stream of 15% sulfuric acid electrolyte for 60 minutes with a current density of 12 amperes per square foot and at an electrolyte temperature of 68–74° F. The interior of the tubing was rinsed with cold water.

The anodic film formed on the interior wall of the tubing sections was impregnated with a cobalt-molybdenum-nickel catalyst as follows:

A solution of the catalyst forming materials was first prepared by adding 1500 milliliters of water, 112 grams of nickel sulfate hexahydrate, 73 grams of cobalt sulfate heptahydrate, 89 grams of ammonium molybdate tetrahydrate and 100 grams of ammonium sulfate. The mixture was heated to 180° F., and 500 milliliters of ammonium hydroxide (28.7% by weight $NH_4OH$) was added with stirring to dissolve all the salts.

Both sections of the aluminum tubing were filled with the above solution, each with 12 milliliters, and placed in an autoclave. The ends of the tube remained open. The autoclave was flushed with hydrogen, and then pressurized with hydrogen at 1000 p.s.i.g. at 350° F. and for four hours. Thereafter, the autoclave was depressurized and cooled to room temperature. The tubing sections, upon removal from the autoclave, were dried at 160° F. for two hours under an absolute pressure of 5 p.s.i. and then calcined at 750° F. for two hours in air.

The above procedure was repeated. The net gain in weight of the tubing was 3.7 grams.

The prepared sections of aluminum tubing were joined to form a 22 foot length tubular reactor. In a hydrogenation treatment, a wax distillate lubricating oil fraction obtained upon distillation of a Mid-Continent paraffinic crude which had been furfural refined to remove a substantial portion of aromatics was employed as the charge stock. The conditions for the reaction are set forth in Table I, below:

*Table I*

| | |
|---|---:|
| Pressure, p.s.i.g. | 4000 |
| Reactor temperature, ° F. | 625 |
| Liquid space velocity, v./v./hr. | 22 |
| Weight space velocity, w./w./hr. | 111.5 |
| Recycle rate of gas (from high pressure separator) s.c.f./bbl. | 12,800 |

From the results, it was found that the color of the charge stock employed in the catalytic treatment improved from 20 as measured on a Lovibond colorimeter employing a ½-inch cell to 5 Lovibond with a 6-inch cell in the product. It will be observed that it was possible to attain an exceptionally high space velocity with a very small amount of active catalyst material under essentially similar conditions as that commonly employed in hydrogenation reactions with conventional catalyst requiring substantially greater quantities of catalyst material.

EXAMPLE 2

Aluminum tubing, in coil form, measuring 10 feet in length, an inside diameter of 0.089 inch, and a wall thickness of 0.049 inch, was anodized on the interior and the anodic film impregnated with a cobalt-molybdenum-nickel catalyst, as in Example 1. The impregnating procedure was performed twice, the tubing showing a net gain in weight of 0.358 gram.

A propylene polymer having a boiling point range of from about 200° F. to 544° F. and an average molecular weight of 224 was hydrogenated by charging the polymer to the tubular reactor under the conditions set forth in Table II, below:

*Table II*

| | |
|---|---:|
| Pressure, p.s.i.g. | 2000 |
| Reactor temperature, ° F. | 650 |
| Contact time, seconds | 0.39 |
| Recycle rate of $H_2$, ft.$^3$/bbl. | 10,000 |
| Double bonds hydrogenated/second/square foot reactor surface | $1.4 \times 10^{21}$ |
| Double bonds hydrogenated/second/foot of tube | $1.0 \times 10^{19}$ |

EXAMPLE 3

Aluminum chain of commercial purity, each link of the chain measuring approximately 7/16-inch, was anodized as in Example 1. The anodic film on the chain was impregnated with a nickel-tungsten catalyst as follows:

A slurry of tungstic acid was prepared by adding 50 grams of the acid to 100 milliliters of water. 140 milliliters of ammonium hydroxide was added, and the mixture was heated to 180° F. for forty minutes to dissolve the salt. On cooling, a slight precipitate occurred, and therefore an additional 10 milliliters of ammonium hydroxide was added to redissolve any precipitate. A second solution was prepared by dissolving 62 grams of nickel sulfate hexahydrate and 33 grams of ammonium sulfate in 200 milliliters of water. The solution was heated to 180° F., and 30 milliliters of ammonium hydroxide was added with stirring. The resulting nickel solution was added to the prepared tungsten solution.

Anodized aluminum chain, weighing 119.7 grams, was placed in a glass tube open at one end and the chain completely submerged with 120 milliliters of the above nickel-tungsten solution. The tube containing the chain and solution was placed in an autoclave, and the anodic film was impregnated with the nickel-tungsten catalyst material by reduction with hydrogen under a pressure of 300 p.s.i.g. at 350° F. and for five hours. The autoclave was then depressurized and cooled to room temperature. The aluminum chain was removed from the autoclave, dried at 160° F. for two hours at an absolute pressure of 5 p.s.i., and then calcined at 750° F. for two hours in air. The net gain in weight of the chain was 5.7 grams.

The treated chain was employed as the catalyst in the desulfurization-hydrogenation of a gas oil fraction obtained from a vacuum pipe still as part of the overhead from the topping of a California crude thereby rendering the gas oil fraction more useful as a cracking stock. The stock had a sulfur content of 1.00% by weight and a carbon residue of 0.41% by weight. Table III, below, shows the conditions for the reaction.

Table III

| | |
|---|---|
| Pressure, p.s.i.g. | 1500 |
| Reactor temperature, °F. | 754 |
| Liquid space velocity, v./v./hr. | 0.76 |
| Recycle rate of gas, s.c.f./bbl. | 12,000 |

As a result of the reaction, the sulfur content was markedly reduced to 0.39% and the carbon residue reduced to 0.02%. The color was improved from a black for the charge stock to a yellow in the product.

EXAMPLE 4

Plates or bands of titanium, of commercial purity, measuring 4 inches x ½-inch x 1/32-inch, were anodized in a boric acid-ammonia solution having a pH of about 8. Anodization was continued for about 7 minutes at 17 volts with an initial current density of 150 amperes per square foot which leveled off to 50 to 70 amperes per square foot and at an electrolyte temperature of about 70 to 74° F. The anodized plates were formed into Raschig rings measuring about ½-inch in diameter. In impregnating the anodic film of the rings with a cobalt-molybdenum-nickel catalyst, 44 grams of Raschig rings were placed in an autoclave and covered with 87 milliliters of the catalyst solution prepared in Example 1. The autoclave was flushed with hydrogen, and then pressured with hydrogen at 1000 p.s.i.g., at 350° F. and for five hours. The autoclave was then depressurized and cooled to room temperature. The rings were removed from the autoclave, dried at 160° F. for two hours and then at 750° F. for two hours in air. The net gain in weight of the rings was 9 grams. The impregnated rings were used in a hydrogenation reaction of a wax distillate fraction similar to that employed in Example 1, the conditions for which are set forth in Table IV, below:

Table IV

| | |
|---|---|
| Hours on stream | 8 |
| Pressure, p.s.i.g. | 1125 |
| Reactor temperature, °F. | 624 |
| Liquid space velocity, v./v./hr. | 1.04 |
| Recycle rate of off gas, s.c.f./bbl. | 5000 |

The color of the charge stock was improved considerably from 225 as measured in a 6 inch cell on a Lovibond colorimeter to 25 in the final product. Moreover, the sulfur content was reduced from 0.42 percent by weight in the charge stock to 0.10 percent in the product.

EXAMPLE 5

58 grams of fine mesh tantalum wire was anodized under the same conditions as that employed for anodizing the titanium rings of Example 4. The anodized wire was impregnated with cobalt-molybdenum-nickel catalyst, as shown in Example 4, and the prepared catalyst material was used in the hydrogenation treatment of a wax distillate fraction similar to that employed in Example 1. The conditions for the reaction are shown in Table V, below:

Table V

| | |
|---|---|
| Hours on stream | 8 |
| Pressure, p.s.i.g. | 1133 |
| Reactor temperature, °F. | 624 |
| Liquid space velocity, v./v./hr. | 1.2 |
| Recycle rate of off gas, s.c.f./bbl. | 5000 |

The color of the charge stock was improved from 225 Lovibond 6 inch cell to 35 Lovibond 6 inch cell in the product, and the sulfur content reduced from 0.42% by weight to 0.15% in the product.

We claim:
1. A process for the hydrogenation of hydrogenatable hydrocarbons which comprises contacting said hydrocarbons with hydrogen at an elevated temperature and pressure in the presence of a catalytic structure consisting essentially of an extended support of a metal selected from the group consisting of aluminum, titanium, tantalum, zirconium and hafnium having an adherent coating of the oxide of the same metal produced artificially on the surface of said metal support and integral therewith and an added hydrogenation catalyst material deposited upon said oxide coating and adherent thereto.

2. A process according to claim 1 wherein said adherent oxide coating is produced by anodic oxidation.

3. A process according to claim 1 wherein said added hydrogenation catalyst material is deposited on said oxide coating by chemical reduction from a solution containing a soluble compound of said catalyst material in contact with said metal oxide on said support.

4. A process according to claim 3 wherein said added hydrogenation catalyst material is deposited on said oxide coating by pressuring said solution with hydrogen.

5. A process according to claim 4 wherein said solution is an aqueous ammoniacal solution of a soluble compound of said catalyst material.

6. A process according to claim 1 wherein said metal substrate defines an elongated reaction zone of substantially uniform cross-sectional area with an inside diameter within the range of 0.05 to 0.5 inch and with said oxide coating an added catalyst on the inside surface of said zone and wherein said hydrocarbon and hydrogen are passed through said reaction zone effecting hydrogenation therein.

References Cited in the file of this patent

UNITED STATES PATENTS

| | | |
|---|---|---|
| 2,526,657 | Guyer | Oct. 24, 1950 |
| 2,890,162 | Anderson et al. | June 9, 1959 |
| 2,930,767 | Novak | Mar. 29, 1960 |
| 2,974,150 | McClements et al. | Mar. 7, 1961 |